United States Patent
Furuta et al.

[11] 3,947,087
[45] Mar. 30, 1976

[54] THIN FILM OPTICAL TRANSMISSION DEVICE

[75] Inventors: Hirosuke Furuta, Kawasaki; Hideki Noda, Mitaka, both of Japan

[73] Assignee: Fujitsu Limited, Kawasaki, Japan

[22] Filed: Feb. 22, 1973

[21] Appl. No.: 334,597

[30] Foreign Application Priority Data
Feb. 28, 1972 Japan............................ 47-20722

[52] U.S. Cl............. 350/96 WG; 350/96 R; 427/163
[51] Int. Cl.²................................................. G02B 5/14
[58] Field of Search ............................... 350/96 WG

[56] References Cited
UNITED STATES PATENTS

| | | | |
|---|---|---|---|
| 3,465,159 | 9/1969 | Stern | 350/96 WG UX |
| 3,537,020 | 10/1970 | Anderson | 350/96 WG UX |
| 3,660,673 | 5/1972 | Anderson | 350/96 WG UX |
| 3,795,434 | 3/1974 | Ash | 350/96 WG |

OTHER PUBLICATIONS

Marcatili, "Dielectric Rectangular Waveguide and Directional Coupler for Integrated Optics," *The Bell System Technical Journal*, Vol. 48, No. 7, Sept. 1969, pp. 2071–2102.

*Primary Examiner*—John K. Corbin
*Attorney, Agent, or Firm*—Staas & Halsey

[57] ABSTRACT

A dielectric thin film optical transmission device in which a dielectric substrate has formed thereon a dielectric thin film of a refractive index larger than that of the substrate and the dielectric thin film has formed thereon in a desired pattern a dielectric layer of a refractive index smaller than that of the dielectric thin film and in which the dielectric thin film underlying the dielectric layer chiefly serves as a light waveguide to transmit light therethrough.

5 Claims, 6 Drawing Figures

THIN FILM OPTICAL TRANSMISSION DEVICE

BACKGROUND OF THE INVENTION

1. Field of the Invention

This invention relates to an optical transmission device, and more particularly to an optical transmission device using a dielectric thin film.

2. Description of the Prior Art

Since light is one kind of electro-magnetic energy which is the same as electric waves of the microwave band or the like, it is theoretically possible to construct an optical transmission device by diminishing a microwave transmission device in size. However, visible radiation of for example, red light has a wavelength of $0.6\mu$, while microwaves of 5GHz have a wavelength of 6cm, and the ratio of their wavelengths is in the order of $10^5$ and this presents various problems.

To avoid these problems, there has heretofore been proposed a multilayer dielectric transmission device such as shown in FIG. 1. In FIG. 1, a dielectric thin film 2 of a refractive index $n1$ is formed on a dielectric substrate 1 of a refractive index $n2$ and a dielectric layer 3 of a refractive index $n3$ is formed on the dielectric thin film 2. Assuming that $n2=n3=1.5$ and that $n1 - 2/n1 - n1 = 2.5 \times 10^{-2}$, where a working wavelength is $1\mu$, it is possible to transmit only the fundamental mode with the thickness $d$ of the dielectric thin film 2 being about $0.6\mu$.

It has also been proposed to use an optical transmission device such as depicted in FIG. 2, in which a dielectric thin film 11 having a width $a$, a thickness $b$ and a refractive index n1 is surrounded by dielectrics 12 of refractive indexes $n2$, $n3$, $n4$ and $n5$. Further, an optical transmission device such as illustrated in FIG. 3 has also been proposed in which a dielectric thin film of a refractive index n1 is formed on a dielectric substrate 13 of a refractive index $n4$. However, in the cases of FIGS. 2 and 3, if the refractive index n1 is several percent greater than those $n2$, $n3$, $n4$ and $n5$, it is necessary to select the width $a$ and the thickness $b$ of the dielectric thin films 11 and 11a less than several microns. In this case, unevenness of the interface between the dielectric thin film 11 and other dielectrics (including air) presents a problem, and it is practically impossible to decrease the unevenness of the interface to such an extent as to be negligible with respect to a transmission wavelength.

SUMMARY OF THE INVENTION

An object of this invention is to provide a novel optical transmission device which is free from the aforesaid defects experienced in the past, is easy to fabricate and allows ease in the selection of transmission characteristics.

The optical transmission device of this invention is characterized in that a dielectric substrate has formed thereon a dielectric thin film of a refractive index greater than that of the substrate; the dielectric thin film has formed thereon in a desired pattern a dielectric layer of a refractive index smaller than that of the dielectric thin film; and the dielectric thin film underlying the dielectric layer permits the passage therethrough of light.

Objects and effects of this invention will become apparent from the following detailed description taken in conjunction with the accompanying drawings.

DESCRIPTION OF THE PREFERRED EMBODIMENTS

Figure 1:
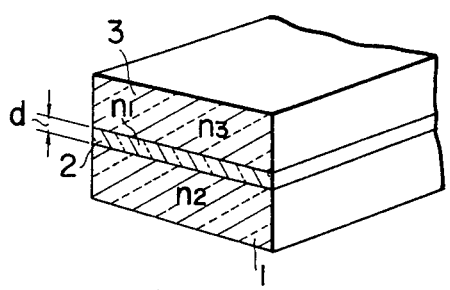
FIGS. 1, 2 and 3, inclusive, are schematic diagrams, for explaining conventional optical transmission devices.
Figure 4:
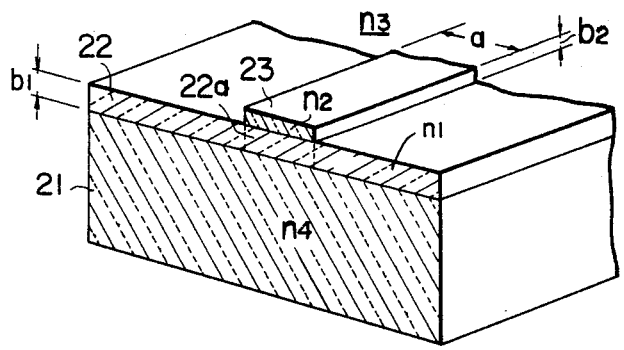
FIG. 4 is a schematic diagram, for explaining an embodiment of this invention.
Figure 2:
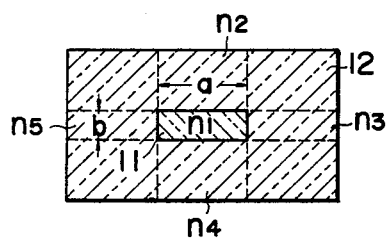

FIG. 4 is a perspective view schematically showing one embodiment of this invention, in which a dielectric thin film 22 of a refractive index $n1$ is formed on a dielectric substrate 21 of a refractive index $n4$ and a dielectric layer 23 having a width $a$ is formed on the dielectric thin film 22 for providing a predetermined transmission path. If the refractive index of the dielectric layer 23 is taken as $n2$ and if the refractive index of air is taken as $n3$, the refractive indexes are selected so that $n1>n2>n3$ and $n1>n4$. With such refractive indexes, a portion 22a of the dielectric thin film 22 immediately below the dielectric layer 23 serves as a light transmission path. The reason for this will hereinbelow be described.

Figure 5:
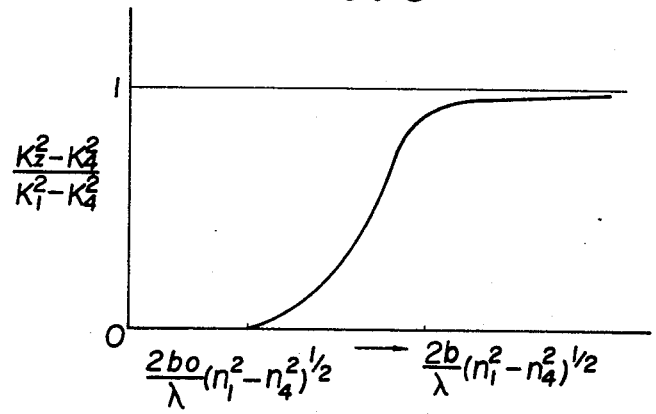
FIGS. 5 and 6 are graphs showing the relationship between the thickness of a dielectric thin film and the coefficient of propagation therethrough.
Figure 3:
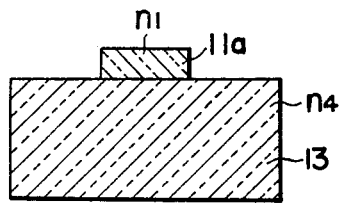
Figure 6:
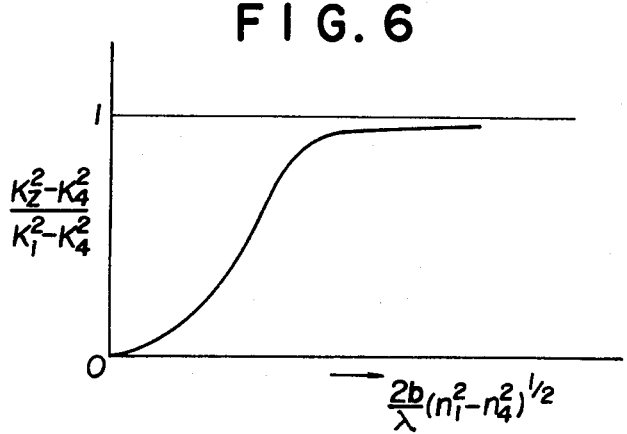

In FIG. 4, where the dielectric layer 23 does not exist, the dielectric thin film 22 is covered with air of the refractive index $n3=1$. If the refractive index n1 of the dielectric thin film 22 is selected so that $n1 = n4(1 + \Delta)$, where $\Delta<<1$, the relationship between the thickness $b$ of the dielectric thin film 22 and the normalized propagation coefficient $$\beta = \frac{K_z^2 - K_4^2}{K_1^2 - K_4^2}$$

is such as shown in FIG. 5, in which $$Ki = \frac{2\pi}{\lambda} n_i (i=1, 2, 3 \text{ and } 4)$$

and $\lambda$ is the wavelength. Namely, the dielectric thin film 22 does not transmit light therethrough, and its thickness is less than a certain value $b_0$. Further, where the dielectric thin film 22 is entirely covered with the dielectric layer 23 and if $n2 = n4$, if $n1 = n4(1 + \Delta)$, where $\Delta<<1$, the thickness $b$ of the dielectric thin film 22 and the light normalized propagation coefficient $\beta$ bear such a relation as depicted in FIG. 6. Namely, even if the thickness $b$ of the dielectric thin film 22 is close to zero, propagation of light is possible. If the refractive index $n2$ of the dielectric layer 23 is selected in such a range that $1<n2<n1$, the result is a characteristic intermediate between those shown in FIGS. 5 and 6. Then, if the thickness $b$ of the dielectric thin film 22 is selected at the cutoff value $b_0$ in the case where the dielectric layer 23 is not provided and if the dielectric layer 23 of the refractive index $n2$ is provided, there exists a mode such that the power of light is centered mainly on the portion 22a of the dielectric thin film 22 immediately below the dielectric layer 23 and propagated. Namely, it is possible to limit the light propagation path in the dielectric thin film 22 in its widthwise direction with the width $a$ of the dielectric layer 23. It may also be considered that the refractive index of the portion 22a is increased to $n1(1 + \Delta)$ equivalently. The light propagation mode is determined by the refractive indexes $n1$, $n2$, $n3$ and $n4$ and the thicknesses $b_1$ and $b_2$ and the width $a$ of the dielectric layer 23. Moreover, so long as the foregoing relationship of $n1>n2>n3>$ and $n1>n4$ is established, it will be appreciated that the layer in contact with film 22 and layer 23 need not be air but any suitable material affording the stated relative refractive index: specifically, $n3<n2$.

Such an optical transmission device is produced by providing on a glass base plate 21 a glass thin film 22 of a refractive index larger than that of the base plate 21, coating light transparent resist on the thin film 22, exposing, developing and etching the resist coated thin film 22 in a desired pattern to provide the dielectric layer 23. Since it is possible in this case, to select an etchant capable of etching only the coated resist, the dielectric layer 23 of very small width can easily be formed by etching without affecting the dielectric thin film 22. Of course, the dielectric layer 23 can be formed not only with the resist but also with other organic or inorganic material. The refractive index $n2$ of the dielectric layer 23 is selected to be smaller than the refractive index value $n1$ of the dielectric thin film 22. Further, the cross-section of the dielectric layer 23 need not be rectangular but instead may be of various other configurations which generally may be described as lens-shaped. A precise rectangular cross-sectional configuration of the patterned dielectric layer 23 is difficult to form in practice and more typically the edges are gently tapered and the corners somewhat rounded, departing thus from a precise rectangle in cross section. Aside from these practical considerations, the cross section may be made of a desired configuration, as an example, the lens-shaped cross section previously noted. Variation of the cross-sectional confirguration of the dielectric layer 23 has a corresponding variation of effect on the transmission path in the dielectric thin film 22 immediately below the dielectric layer 23. With the dielectric layer 23 becoming thick with respect to the transmission wavelength, for the altered cross-sectional configuration, such as lens-shaped, the influence exerted upon the dielectric thin film 22 immediately underlying the layer 23 is similar to that where the layer 23 is rectangular in section. Further, it is not always necessary to select the thickness of the dielectric thin film 22 at the cutoff value $b_0$ and the thickness can be selected in accordance with the condition for the propagation of light.

With this invention, by providing on a dielectric thin film a dielectric layer of a refractive index smaller than that of the dielectric thin film in a desired pattern, a light transmission path can be formed in that pattern and the fabrication of the device is extremely easy as has been described in the foregoing. Accordingly, this invention can provide an optical transmission device which might be called integrated optics.

It will be apparent that many modifications and variations may be effected without departing from the scope of the novel concepts of this invention.

What is claimed is:

1. Radiation transmission apparatus comprising:
   a dielectric substrate having a first refractive index;
   a dielectric thin film disposed upon said dielectric substrate and having a second refractive index greater than said first refractive index; and
   a dielectric layer of a desired pattern disposed on said dielectric thin film, said dielectric layer having a third refractive index less than said second refractive index and having smaller lateral dimension than said dielectric thin film, and a covering layer disposed on said dielectric thin film and on said dielectric layer of the desired pattern disposed on said dielectric thin film, and having a fourth refractive index less than said third refractive index, whereby radiation is transmitted mainly in that portion of said dielectric thin film underlying said dielectric layer.

2. Radiation transmission apparatus as claimed in claim 1, wherein said dielectric layer is rectangular in section.

3. Radiation transmission apparatus as claimed in claim 1, wherein said dielectric thin film has a thickness sufficient to cut off radiation transmission in the absence of said dielectric layer.

4. Radiation transmission apparatus as recited in claim 1, wherein said covering layer comprises an air layer.

5. In combination, a planar dielectric thin-film waveguiding layer, passive means in contact with one surface of said layer for defining in said layer a region having an effective index of refraction that is higher than that in the other regions of said layer whereby waveguiding in said planar layer is confined to said defined region, wherein said passive means comprises only a single longitudinal dielectric stripe element deposited on a portion of the top surface of said layer directly overlying said defined region, and further comprising an ambient medium in contact with the remaining portions of said top surface of said layer and in contact with the top surface of said stripe element, the index of refraction of said single stripe element being greater than the index of refraction of said medium but less than the index of refraction of said layer.

* * * * *

UNITED STATES PATENT AND TRADEMARK OFFICE
CERTIFICATE OF CORRECTION

PATENT NO. : 3,947,087
DATED : March 13, 1976
INVENTOR(S) : Hirosuke Furuta; Hideki Noda It is certified that error appears in the above-identified patent and that said Letters Patent are hereby corrected as shown below:

Column 1, line 26, "$-2/n1 -n1 = 2.5 \times 10^{-2}$" should be ---$2/n1 - 2.5 \times 10^{-2}$---.

Column 1, line 29, "d" should be --$\underline{d}$--.
Column 1, line 33, "a" should be --$\underline{a}$--.
Column 1, line 33, "b" should be --$\underline{b}$--.
Column 1, line 42, "a" should be --$\underline{a}$--.
Column 1, line 42, "b" should be --$\underline{b}$--.
Column 2, line 18, "a" should be --$\underline{a}$--.
Column 2, line 34, "b" should be --$\underline{b}$--.
Column 2, line 52, "b" should be --$\underline{b}$--.
Column 2, line 55, "b" should be --$\underline{b}$--.
Column 2, line 60, "b" should be --$\underline{b}$--.
Column 3, line 1, "a" should be --$\underline{a}$--.
Column 3, line 6, "a" should be --$\underline{a}$--.

Signed and Sealed this

Sixth Day of July 1976

[SEAL]

Attest:

RUTH C. MASON
*Attesting Officer*

C. MARSHALL DANN
*Commissioner of Patents and Trademarks*